(12) United States Patent
Dhir et al.

(10) Patent No.: US 9,143,615 B2
(45) Date of Patent: *Sep. 22, 2015

(54) SYSTEM AND METHOD FOR PROVIDING CALL-BACK OPTIONS

(71) Applicant: JPMorgan Chase Bank, N.A., New York, NY (US)

(72) Inventors: Nitin Dhir, Hockessin, DE (US); Richard H. Hogrogian, Cherry Hill, NJ (US); Robert Thomas O'Reilly, Jr., Nazareth, PA (US); Ravi Kappagantu, Newark, DE (US)

(73) Assignee: JP Morgan Chase Bank, N.A., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/302,838

(22) Filed: Jun. 12, 2014

(65) Prior Publication Data

US 2014/0294168 A1    Oct. 2, 2014

Related U.S. Application Data

(63) Continuation of application No. 14/028,864, filed on Sep. 17, 2013, now Pat. No. 8,781,096, which is a continuation of application No. 13/411,720, filed on Mar. 5, 2012, now Pat. No. 8,565,402, which is a (Continued)

(51) Int. Cl.
*H04M 3/42* (2006.01)
*H04M 3/523* (2006.01)
*H04M 3/51* (2006.01)

(52) U.S. Cl.
CPC ........ *H04M 3/5231* (2013.01); *H04M 3/42195* (2013.01); *H04M 3/5183* (2013.01); *H04M 3/5166* (2013.01); *H04M 2242/00* (2013.01); *H04M 2242/08* (2013.01)

(58) Field of Classification Search
CPC ......... G06Q 10/06; H04M 2203/2011; H04M 2203/2061; H04M 2242/00; H04M 2242/08; H04M 2242/12; H04M 3/323; H04M 3/36; H04M 3/4285; H04M 3/42195; H04M 3/493; H04M 3/51; H04M 3/5166; H04M 3/5175; H04M 3/5183; H04M 3/523; H04M 3/5231; H04M 3/5232; H04M 3/5233; H04M 3/5237; H04M 3/5238
USPC ............. 379/265.01, 265.02, 265.03, 265.04, 379/265.05, 265.06, 265.07, 265.08, 379/265.09, 265.1, 265.11, 265.12, 265.13, 379/265.14, 266.01, 266.02, 266.03, 379/266.04, 266.05, 266.06, 266.07, 379/266.08, 266.09, 266.1
See application file for complete search history.

(56) References Cited

U.S. PATENT DOCUMENTS 4,694,483 A    9/1987 Cheung
4,792,968 A   12/1988 Katz (Continued)

OTHER PUBLICATIONS

VocalTec Ltd., VocalTec Telephony Gateway, Product Brochure, 8 pages, 1993-1996.

(Continued)

*Primary Examiner* — Khai N Nguyen
(74) *Attorney, Agent, or Firm* — Goodwin Procter LLP

(57) ABSTRACT

A system and method for providing call-back options is disclosed. The method comprises receiving a call in a call routing system, providing at least one call-back option for a caller to receive a call-back, re-allocating resources in the call routing system based at least in part on the at least one call-back option, and calling the caller based on the at least one call-back option. The caller may specify a specific time, a relative time, or a time range when a call-back is preferred. The caller may also specify one or more telephone numbers in combination with the time preferences. The call-back may be initiated by a voice response unit (VRU) and additional call-back options may be presented to the customer who responds to the call-back.

19 Claims, 3 Drawing Sheets

Related U.S. Application Data continuation of application No. 10/821,955, filed on Apr. 12, 2004, now Pat. No. 8,155,297.

(60) Provisional application No. 60/526,138, filed on Dec. 2, 2003.

(56) References Cited

U.S. PATENT DOCUMENTS

| | | |
|---|---|---|
| 4,845,739 A | 7/1989 | Katz |
| 4,930,150 A | 5/1990 | Katz |
| 4,939,773 A | 7/1990 | Katz |
| 4,975,945 A | 12/1990 | Carbullido |
| 4,987,590 A | 1/1991 | Katz |
| 5,014,298 A | 5/1991 | Katz |
| 5,073,929 A | 12/1991 | Katz |
| 5,128,984 A | 7/1992 | Katz |
| 5,164,981 A | 11/1992 | Mitchell et al. |
| 5,181,238 A | 1/1993 | Medamana et al. |
| 5,185,787 A | 2/1993 | Katz |
| 5,206,903 A | 4/1993 | Kohler et al. |
| 5,212,789 A | 5/1993 | Rago |
| 5,224,153 A | 6/1993 | Katz |
| 5,231,571 A | 7/1993 | D'Agostino |
| 5,251,252 A | 10/1993 | Katz |
| 5,255,309 A | 10/1993 | Katz |
| 5,278,898 A | 1/1994 | Cambray et al. |
| 5,297,197 A | 3/1994 | Katz |
| 5,309,505 A | 5/1994 | Szlam et al. |
| 5,309,513 A | 5/1994 | Rose |
| 5,351,285 A | 9/1994 | Katz |
| 5,359,645 A | 10/1994 | Katz |
| 5,396,542 A | 3/1995 | Alger et al. |
| 5,436,965 A | 7/1995 | Grossman et al. |
| 5,442,688 A | 8/1995 | Katz |
| 5,444,774 A | 8/1995 | Friedes |
| 5,450,479 A | 9/1995 | Alesio et al. |
| 5,465,290 A | 11/1995 | Hampton et al. |
| 5,467,391 A | 11/1995 | Donaghue, Jr. et al. |
| 5,495,284 A | 2/1996 | Katz |
| 5,511,112 A | 4/1996 | Szlam |
| 5,515,428 A | 5/1996 | Sestak et al. |
| 5,517,566 A | 5/1996 | Smith et al. |
| 5,519,772 A | 5/1996 | Akman et al. |
| 5,519,773 A | 5/1996 | Dumas et al. |
| 5,546,452 A | 8/1996 | Andrews et al. |
| 5,561,711 A | 10/1996 | Muller |
| 5,608,789 A | 3/1997 | Fisher et al. |
| 5,675,607 A | 10/1997 | Alesio et al. |
| 5,742,675 A | 4/1998 | Kilander et al. |
| 5,757,904 A | 5/1998 | Anderson |
| 5,761,288 A | 6/1998 | Pinard et al. |
| 5,784,452 A | 7/1998 | Carney |
| 5,787,154 A | 7/1998 | Hazra et al. |
| 5,825,856 A | 10/1998 | Porter et al. |
| 5,825,870 A | 10/1998 | Miloslavsky |
| 5,828,734 A | 10/1998 | Katz |
| 5,848,143 A | 12/1998 | Andrews et al. |
| 5,878,130 A | 3/1999 | Andrews et al. |
| 5,884,032 A * | 3/1999 | Bateman et al. ............ 709/204 |
| 5,898,762 A | 4/1999 | Katz |
| 5,917,893 A | 6/1999 | Katz |
| 5,974,120 A | 10/1999 | Katz |
| 6,049,811 A | 4/2000 | Petruzzi et al. |
| 6,134,315 A | 10/2000 | Galvin |
| 6,175,563 B1 | 1/2001 | Miloslavsky |
| RE37,073 E | 2/2001 | Hammond |
| 6,263,066 B1 * | 7/2001 | Shtivelman et al. ..... 379/266.06 |
| 6,301,351 B1 | 10/2001 | King |
| 6,311,231 B1 * | 10/2001 | Bateman et al. ......... 379/265.09 |
| 6,327,359 B1 | 12/2001 | Kang et al. |
| 6,330,327 B1 | 12/2001 | Lee et al. |
| 6,668,286 B2 * | 12/2003 | Bateman et al. .................. 710/6 |
| 7,127,059 B2 | 10/2006 | Galvin |
| 7,159,043 B2 * | 1/2007 | Bateman et al. .................. 710/6 |
| 7,761,323 B2 | 7/2010 | Rafter et al. |
| 2002/0032809 A1 * | 3/2002 | Bateman et al. .................. 710/5 |
| 2002/0055906 A1 | 5/2002 | Katz et al. |
| 2003/0037113 A1 * | 2/2003 | Petrovykh .................... 709/205 |
| 2003/0231647 A1 | 12/2003 | Petrovykh |
| 2004/0059841 A1 * | 3/2004 | Bateman et al. .................. 710/6 |
| 2004/0141508 A1 * | 7/2004 | Schoeneberger et al. ..... 370/401 |

OTHER PUBLICATIONS

Telephony, printed May 25, 1999, 1 page.

VocalTec Ltd., Telephony Gateway, Product Overview, VolcalTec's Telephony Gateway Product Component Description and Functional Specifications, 9 pages, 1993-1996.

Computer Telephony Solutions—Telemarketing, The Customer Interaction Specialists, Telemarketing & Customer Support Outsourcing, printed May 25, 1999, 2 pages.

Computer Telephony Solutions—Internet Telephony, the Customer Interaction Specialits, Internet Telephony, printed May 25, 1999, 1 page.

Kelly Mahoney, Customer Base Management: Leverage Telemarketing and Call Center Environment, Direct Marketing, vol. 95, No. 6, pp. 20, 67, Oct. 1996 (Abstract—3 pages).

CSU/DSU (Channel Service Unit/Data Service Unit), pp. 208-210.

Computer Telephony Solutions—Computer Telephony, The Customer Interaction Specialists, Computer Telephony Systems, printed May 25, 1999, 3 pages.

Computer Telephony Solutions—Call/Web Centres, The Customer Interaction Specialist, Call and Web Centres, printed May 25, 1999, 5 pages.

* cited by examiner

SYSTEM AND METHOD FOR PROVIDING CALL-BACK OPTIONS

CROSS REFERENCE TO RELATED APPLICATIONS

This application claims priority to U.S. Provisional Patent Application Ser. No. 60/526,138, entitled "System and Method for Providing Call-Back Options," filed on Dec. 2, 2003. This application is a continuation of U.S. patent application Ser. No. 14/028,864, entitled "SYSTEM AND METHOD FOR PROVIDING CALL-BACK OPTIONS", filed Sep. 17, 2013, now U.S. Pat. No. 8,781,096, which is a continuation of U.S. patent application Ser. No. 13/411,720, entitled "SYSTEM AND METHOD FOR PROVIDING CALL-BACK OPTIONS" filed on Mar. 5, 2012, NOW U.S. Pat. No. 8,565,402, and which is a continuation of U.S. patent application Ser. No. 10/821,955, entitled "SYSTEM AND METHOD FOR PROVIDING CALL-BACK OPTIONS" filed on Apr. 12, 2004, now U.S. Pat. No. 8,155,297. This application is related to U.S. patent application Ser. No. 10/286,767, entitled "System and Methods for Call Decisioning in a Virtual Call Center Integrating Telephony with Computers", filed on Nov. 4, 2002, which is a continuation of U.S. patent application Ser. No. 09/349,960 entitled "System and Method for Call Decisioning in a Virtual Call Center Integrating Telephone with Computers," filed on Jul. 9, 1999, now U.S. Pat. No. 6,553,113. All of these patent applications are herein incorporated by reference in their entirety.

FIELD OF THE INVENTION

The present invention relates generally to a system and method for routing phone calls to provide a positive and personalized service environment. More particular the present invention relates to a system and method for providing call-back options.

It is increasingly common that consumers seek service from business concerns using the telephone. For example, a consumer seeking to place an order, schedule a delivery, file a complaint, or query an account balance may place a call to a centralized number provided by a business concern. It is well known that businesses often provide such numbers as so-called toll-free "800" numbers or the like. Some toll-free sites are so-called "virtual call centers," where callers interact with a "front-end" interactive voice response unit (IVR or VRU) before their calls are routed to agents at call centers at different geographic locations.

Due to high call volumes and limited system resources, calls received at a virtual call center may be queued according to the order in which they are received. A caller sometimes may have to wait on line for an extended period of time before an agent becomes available. There are a number of disadvantages in keeping customers on hold. First of all, such long and boring experiences often result in customer dissatisfaction. Second, running out of time or being impatient, some customers may prematurely end the call, which may result in loss of sales. In addition, keeping a number of phone lines actively connected to a virtual call center for a long time also means more costs for the host business.

A few solutions have been proposed to alleviate these problems. Some solutions attempt to estimate a length of time that a caller may have to wait before a call center agent becomes available. The estimated wait time is typically announced to the caller periodically when the caller is on hold. Another solution goes one step further by not only estimating an estimated wait-time but also offering to call the caller back after she estimated time period expires. However, these solutions only provide limited options for the caller and are not flexible in their implementations.

Other problems and drawbacks also exist.

SUMMARY OF THE INVENTION

In view of the foregoing, it would desirable to provide a solution for managing phone calls at a virtual call center which overcomes the above-described deficiencies and shortcomings.

It is one advantage of the present invention to enhance customer satisfaction by providing callers wish flexible call-back options.

It is another advantage of the present invention to improve the efficiency of a virtual call center or a call routing system by effectively allocating system resources.

To achieve these and other advantages of the present invention, and in accordance with the purpose of the invention, as embodied and broadly described, an embodiment of the present invention comprises a method for providing call-back options. The method comprises receiving a call in a call routing system; providing at least one call-back option for a caller to receive a call-back; re-allocating resources in the call routing system based at least in part on the at least one call-back option; and calling the caller based on the at least one call-back option.

Another embodiment of the present invention comprises a system for providing call-back options. The system comprises means for receiving a call in a call routing system; means for providing at least one call-back option for a caller to receive a call-back; means for re-allocating resources in the call routing system based at least in part on the at least one call-back option; and means for calling the caller based on the at least one call-back option.

The accompanying drawings are included to provide a further understanding of the invention and are incorporated in and constitute part of this specification, illustrate several embodiments of the invention and, together with the description, serve to explain the principles of the invention. It will become apparent from the drawings and detailed description that other objects, advantages and benefits of the invention also exist.

Additional features and advantages of the invention will be set forth in the description that follows, and in part will be apparent from the description, or may be learned by practice of the invention. The objects and other advantages of the invention will be realized and attained by the system and methods, particularly pointed out in the written description and claims hereof as well as the appended drawings.

BRIEF DESCRIPTION OF THE DRAWINGS

The purpose and advantages of the present invention will be apparent to those of skill in the art from the following detailed description in conjunction with the appended drawings in which like reference characters are used to indicate like elements, and in which.

DETAILED DESCRIPTION OF THE INVENTION

Reference will now be made in detail to the present embodiments of the invention, examples of which are illustrated in the accompanying drawings.

Figure 2:
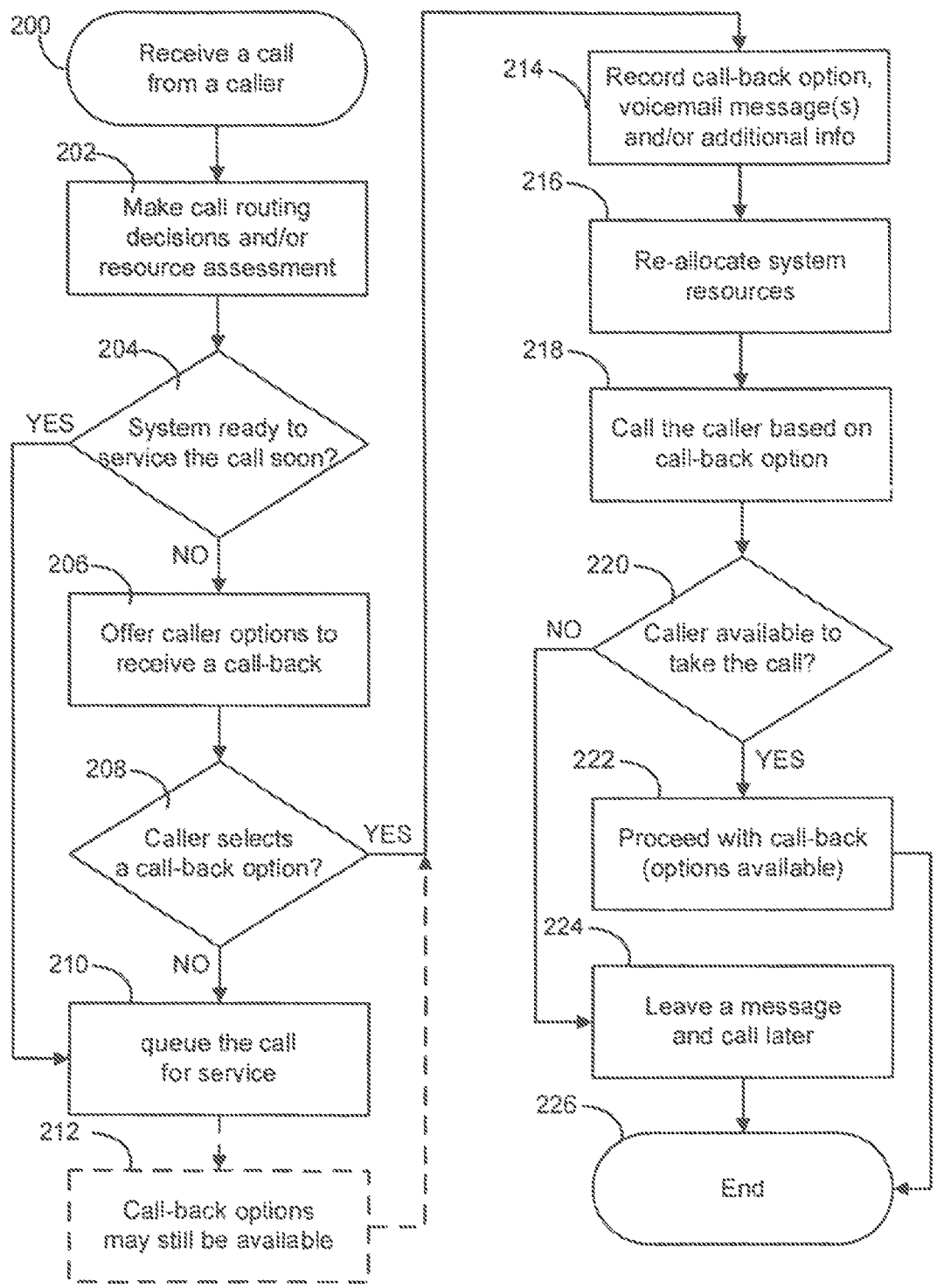
FIG. 2 is a flow chart illustrating an exemplary method for providing call-back options according to an embodiment of the present invention.

FIG. 2 is a flow chart illustrating an exemplary method for providing call-back options according to an embodiment of the present invention.

In step 200, a phone call may be received from a caller ("customer"). The caller may be calling into a call routing system for a number of reasons. For example, the caller may be an existing customer calling for customer service. Or the caller may be a potential customer calling to make inquiries and/or place orders. The caller may be greeted by an interactive voice response unit (IVR or VRU). The IVR may collect information from the caller (e.g., using touch-tone activated voice menus and/or voice-recognition technology). According to one embodiment of the invention, at least part of the caller's information may be identified or confirmed via Automatic Number Identification (ANI). For example, the call routing system may automatically identify the phone number from which the call originates and retrieve account information associated with the identified phone number.

In step 202, call routing decisions may be made. Based on the information collected, decisions may be made to route the call to a proper target (e.g., a qualified agent at a queue at a call site). At the same time and/or following the call decisioning, an assessment of the system resources may be made. The system resources may include, for example, the number of phone lines available for call routing, the number of call site centers and/or qualified agents available to handle the call.

In step 204, it may be determined whether the call routing system is ready to service the call soon. Based on the call routing decision(s) and/or resource assessment, it may be estimated as to how long the caller will have to wait before the call can be properly routed and adequately serviced by a qualified agent. Sometimes, a call routing system can be overloaded with inbound calls and a long queue of callers may already have been kept waiting for service. If that is the case, it may be determined that the system is not ready for prompt service of the call. Therefore, in step 206, the caller may be notified of the situation and offered a number of options to receive a call-back at a later time.

The decision on call-routing and/or call-back options may also be based at least in part on a priority of the caller. A caller may have been categorized into different priority classes depending en the caller's identity, account status and business relation, etc. Callers with higher priorities may require more expedited services man those with lower priorities.

The threshold(s) for call routing and call-back options may be flexibly configured and updated by an administrator of the call-routing system. As mentioned above, the threshold(s) may take into account various factors such as length of queue, priorities of the callers, and availability of system resources, for example. The status of the call-routing system may be dynamically monitored and compared to the predetermined thresholds. If one or more of the thresholds are met, the functions associated with call-back options may be triggered.

If the estimated wait is relatively short, the call may be immediately muted to its proper target and queued for service in step 210. While the caller is waiting on line to be serviced, call-back options may still be available in step 212. For example, if somehow the wait is longer than initially estimated or if the caller somehow has to get off line sooner, the caller may still choose to receive a call-back at a different time. The call-back options may be accessible, for example, by pressing one or more touch-tone buttons.

The call-back options as offered in steps 206 and 212 may be presented to the caller via an interactive voice response unit. For example, a voice may announce to the caller, "We can take your information and call you back." Then a number of call-back options may be presented for the caller to select.

According to one embodiment of the present invention, the system may offer to call the caller back at a first opportunity, i.e. as soon as system resources become available to service this particular caller.

Or the system may offer to call the caller at a specific time. For example, the caller may specify a preferred time or time range to receive a call-back. For example, the caller may choose to receive a call-back at or around 8 PM, or between 8 PM and 8:30 PM. The caller may also have the option to specify more than one time or time range to receive the call-back. For example, the caller may enter a second or third preferred time or time range to receive the call-back. In the event when the system is not able to call or reach the caller at the first specified time or time range, a second or third attempt may be made to reach the caller.

Another call-back option may be to call the caller at a relative time or time range with respect to the time of the current call. For example, the caller may choose to receive a call-back in exactly three hours or during the next two hours. Again, a second and third choice may be selected in case the caller cannot be reached at the first specified time or time range.

According to embodiments of the present invention, the above described call-back options may be combined. For example, a caller at work who is leaving the office in four hours may have the system to call back as soon as possible during the next four hours or otherwise to call back the next day during work hours when the caller is back in the office. In addition, one or more phone numbers may be provided by the caller to indicate where the caller would like to receive the call-back. Furthermore, different phone numbers may be provided in each of the call-back options and/or their combinations. For example, the caller may have the system call a business phone during the day and a home phone in the evening hours. If no phone number has been specified by the caller for the call-back purpose, the number from which the current call is made ("Caller ID") may become a default call-back number. Other variations and/or combinations of call-back options are also available.

In step 208, the caller may select a call-back option. If the caller does not make a selection or choose to stay on line, the call may be routed and queued for service in step 210. If the caller doss choose one of the available call-back options, the caller's selection may be recorded in step 214. The caller's selection may include the preferred phone number(s) by which the caller can be reached and the preferred time or time range(s) when the call-back is expected. According to embodiments of the present invention, the caller may also leave one or more voicemail messages to provide additional information associated with the call and call-back. Further, the caller may visit a designated internet website to enter the call-back options. For example, the IVR may announce the website address. The caller may choose to hang up and go online to specify the above-described call-back preferences including time, phone number(s) and combinations thereof. The call-back preferences may be communicated to the call-routing system via a network connection.

According to one embodiment, the initial phone call, the selection of call-back options, and/or the call-back operation may be carried out over the Internet (e.g., Voice over IP or VoIP) or may be based on other telephony technologies (e.g., voice recognition). For example, as a caller makes a VoIP call from a networked computer to a call center, the caller may be able to select a call-back option in a variety of ways. Apart from the touch-tone method, voice recognition technology may be used to record the caller's response or a web dialog window may pop out on the caller's screen for selection of call-back options.

In step 216, resources of the call routing system may be re-allocated based at least in part on the call-back options recorded and/or accumulated in the system. During times of high demand, an increasing number of callers may have selected call-back options. In the meantime, as agents continue to process existing calls in the queue(s), system resources may become available. As a result, the system resources, such as the phone lines and qualified agents, may be re-allocated to service new incoming calls and the scheduled call-backs. According to one embodiment of the present invention, a resource re-allocation strategy may be implemented by the call routing system to dynamically assess the demands on the system versus available resources, and allocate the limited resources fox different call-processing tasks. For example, the number of live callers and scheduled call-backs may be considered in determining what portion of the agents may be switched to service call-backs. In addition, the call-backs may be prioritized based on a plurality of predetermined criteria. For example, call-backs concerning more urgent or time-sensitive businesses may have higher priorities than the others. The call-backs may also be prioritized based on the priority classes of the callers.

In step 218, the customer may be called based on the call-back option selected. According to an embodiment of the present invention, the call-back may be initiated by a live agent or an interactive voice response unit. For example, an IVR may dial a number at a certain time, where the number has been specified by the customer and the time is in accordance with the call-back option selected earlier by the customer.

In step 220, it may be determined if the caller is available to take the call. If no one answers the phone and a voicemail prompt is heard, the IVR may leave a message for the customer in step 224 and the system may schedule another call-back in a later time.

If the customer answers the phone, the system may proceed with the call-back in step 222. For example, the IVR may greet the customer with a voice saying "Your call is scheduled . . . can you take it now?" The IVR may give the customer further interactive options such as taking the call now, rescheduling the call or canceling the calk If the customer decides to take the call, the call may be routed to be serviced by a live agent immediately. If the customer decides to reschedule the call, the same or a similar menu of call-back options as described above may be presented to the customer for selection. Based on the customer's response to the call-back and/or the further options, information concerning this customer's call-back options may be updated in the call routing system.

The exemplary method ends in step 226.

According to embodiments of the present invention, the above described method for providing call-back options may be implemented in a number of ways. It may be integrated in a call routing system or operate as an add-on system to an existing call-routing system or call site center system.

Figure 1:
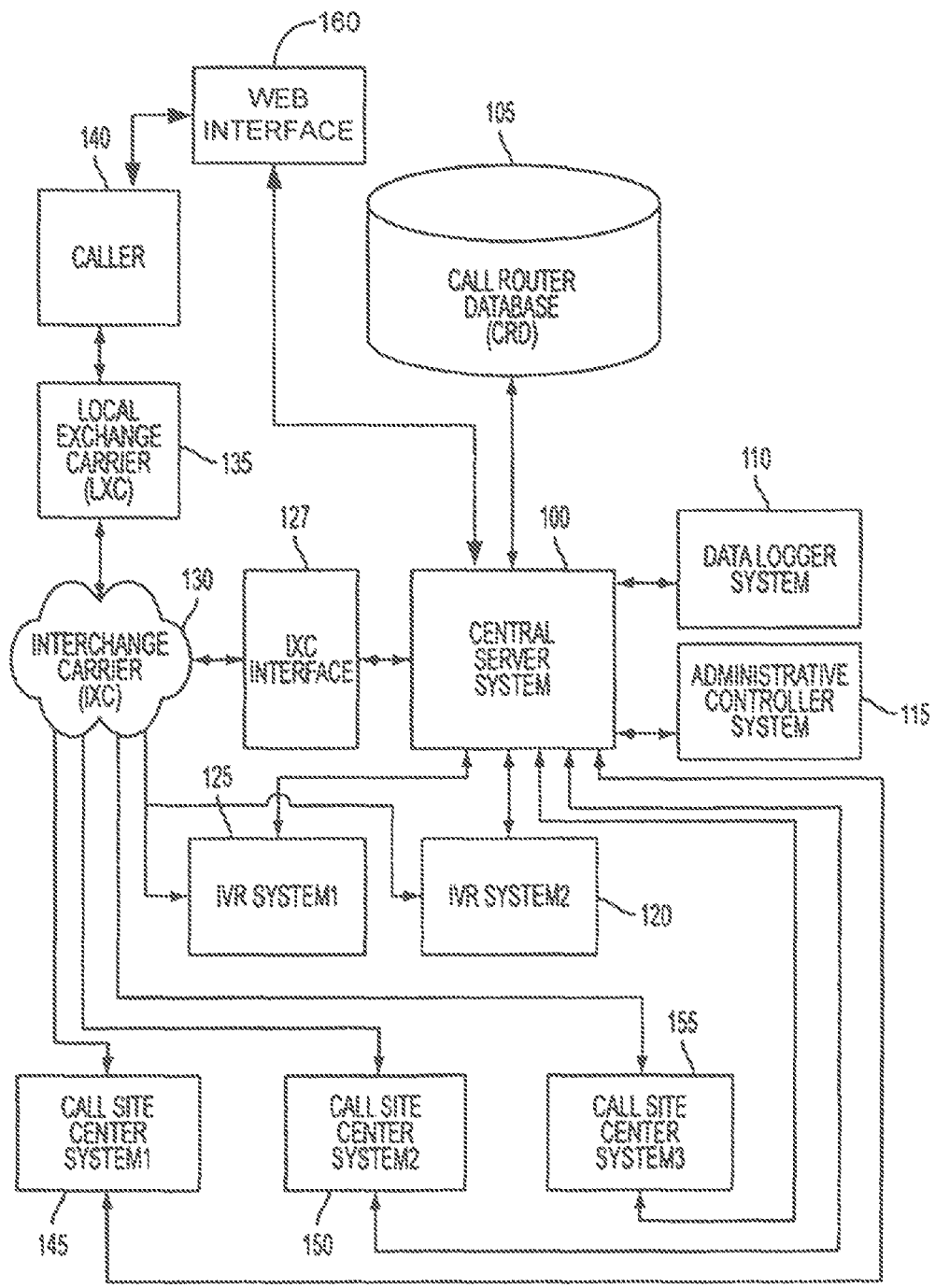
FIG. 1 is a block diagram illustrating an exemplary call routing system in which embodiments of the present invention may be implemented.

FIG. 1 is a block diagram illustrating an exemplary call routing system in which embodiments of the present invention may be implemented. U.S. patent application Ser. No. 10/286,767, entitled "System and Methods for Call Decisioning in a Virtual Call Center Integrating Telephony with Computers," filed on Nov. 4, 2002, discloses a server-based call routing system, an overview of which is illustrated in FIG. 1. This call routing system comprises central server system 100; data logger system 110; administrative controller system 115; call router database 105; IVR system1 125; IVR system2 120; call site center system1 145; call site center system2 150; call site center system3 155; IXC interface 127; inter-exchange carrier (IXC) 130; local exchange carrier 135; web interface 160; and caller 140.

Central server system 100 comprises a server system for centralized control over the call routing and call-back options in the call routing system. Generally, central server system 100 includes hardware and software for supporting system administration, database management, carrier network interface, and transmission/reception of data to/from the central IVR's (blocks 120 and 125) and call site center systems (blocks 145-155). In general, central server system 100 receives routing requests from inter-exchange carrier (IXC) 130, processes said requests as well as other information, and then issues a return route address to IXC 130 to control where a call is routed.

Data logger system 110 comprises hardware and software for logging activity of the call routing system. Administrative controller system 115 may comprise a workstation or the like for administering and monitoring the call routing system. Call router database (CRD) 105 comprises storage means for storing data for the call router system. IVR system 1 125 and IVR system 2 120 collect information from callers (e.g., using touch-tone activated voice menus) in order to route calls to the proper target, such as to a qualified agent at a queue at a call site.

Call site center systems 1-3 (blocks 145-155) comprise call sites for receiving calls forwarded by IXC 130. Generally, said call sites will comprise one or more so-called peripherals capable of receiving calls, such as local VRU's, PBX's (Private Branch Exchange), and ACD's (Automatic Call Distributors). Said call sites generally include agents and agent workstations for human-assisted call processing.

IXC interface 127 represents hardware/software that may be required to convert data transmitted between IXC 130 and central server system 100. IXC 130 represents the long distance carrier network that is controlled by central server system 100 to route calls to call sites and queues at the different geographic locations. Local exchange carrier (LXC) 135 represents a local phone network rise receives a customer's call in a local area for forwarding to IXC 130.

Web interface 160 may be an interface or connection between an internet website and the central server system 100. User 140 may interact with the website to enter call-back preferences that are subsequently communicated to the central server system 140 and stored in CRD 105.

In this call routing system as depicted in FIG. 1, the method for providing call-back options in accordance wills the present invention may be implemented, both at the system level and at the call site level.

At the system level, all the activities related to call-back options may be controlled and coordinated by central server system 100. For example, when caller 140 calls in, the call may be first forwarded (i.e., pre-routed) to one of the IVR systems (e.g., IVR system1 125). Caller 140 can receive automated servicing and access his/her accounts) using touch-tone controlled menus. If caller 140 seeks servicing by a live agent, a routing request may be sent to central server system 100. Central server system 100 may interact with CRD 105, data logger system 110, administrative controller system 115 and other system resources to make a call-routing decision. Central server system 100 may not only identify a suitable call-routing target (e.g., call site center and/or agent)

for the service requested, but also assess the availability of the target. For example, it may be determined how many callers are already queued for the target and how long caller 140 may be kept waiting. If the call site center and/or agent is immediately available to service the call, the call may be routed accordingly. If, however, the call site center and/or agent is not immediately available, central server system 100 may instruct IVR system1 125 to present a plurality of call-options to caller 140. If caller 140 chooses to stay on line, the call may be routed to the suitable target and queued for service. If caller 140 selects one of the call-back options, the caller's call-back preferences and any additional information may be recorded by IVR system 1 125 and sent to central server system 100, where the call-back information is processed before being sent to CRD 105 for storage.

Central server system 100 may continuously or periodically assess the system resources, re-allocate the resources, and schedule call-backs. When it is time for a scheduled call-back, central server system 100 may retrieve the relevant caller information and call-back information from CRD 105 and pass the information on to one of the IVR systems (e.g., IVR system2 120) with instructions to initiate a call-back.

At the call site level, the call-back options may be provided to the callers in a service queue for a call site center or call agent. Much like the operations at the system level, the resources of the call site center may be evaluated against ongoing service requests. The resources may be dynamically re-allocated between the service for live callers and the service for call-backs.

Figure 3:
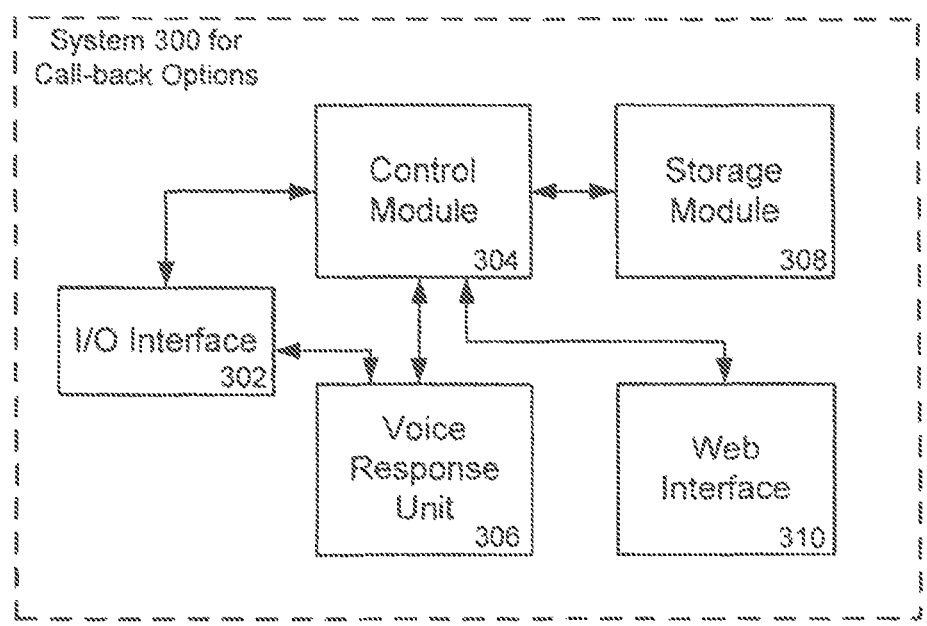
FIG. 3 is a block diagram illustrating an exemplary system for providing call-back options according to an embodiment of the present invention.

As noted earlier, the call-back options may be implemented in an add-on system to an existing call-routing system or call site center system. FIG. 3 is a block diagram illustrating an exemplary system 300 for providing call-back options according to an embodiment of the present invention. System 300 comprises an I/O Interface 302, a Control Module 304, a Voice Response Unit (VRU) 306, a Storage Module 308, and a Web Interface 310. I/O Interface 302 may function as an data/voice interface between System 300 and an exist call-routing system or call site center system. For example, connections may be made through I/O Interface 302 for telephone voice streams as well as computer data streams. Control Module 304 may be a processor capable of data manipulation, logic operation and mathematical calculation. It can also interact with the other components in System 300 and coordinate their operations. VRU 306 may have interactive means (e.g., touch-activated voice menus) to communicate with callers and collect information from them. Storage Module 308 may comprise storage means (e.g., semiconductor memory, hard disk, nonvolatile memory and CD-ROM etc.) for storing call-back related information such as caller data and call-back preferences. Web Interface 310 may comprise an internet website where a caller or visitor may interactively enter call-back options.

In operation, System 300 may interact with the existing call system to provide call-back options. System 300 may either be a passive subordinate to the existing system or it may actively supplement the existing system with call-back functions. In a passive role, System 300 may simply receive calls routed from the existing system. For example, if a caller's queue in the existing system reaches a predetermined length, additional calls may be automatically routed to System 300. In an active role, System 300 may evaluate system load of the existing system, identify the callers who might need call-back options, and re-route those calls. Control Module 304 may receive caller data as well as other information or instructions from the existing system via I/O Interface 302. Accordingly Control Module 304 may give instructions to VRU 306 to greet the caller, offer the call-back options and record the caller's selection. Alternatively, the caller may be directed to visit an internet website associated with Web interface 310 to enter call-back options. The call-back related information may then be processed in Control Module 304, where the call-backs may be prioritized and scheduled. The processed data may be stored in Storage Module 308. Control Module 304 may receive status reports from the existing system and use the status data in processing the call-backs. When it is time for a scheduled call-back, Control Module 304 may retrieve the relevant data from Storage Module 308, instruct VRU 306 to initiate a call to the customer, and coordinate with the existing system to route the call to a proper target.

At this point, it should be noted that the system and method for providing call-back options in accordance with the present invention are not limited to inbound cads into a call-routing system. In fact, call-back options may be provided to any person who attempts to communicate with a business or individual. The communication may be via mail, telephone, internet or in person, for example. If such is the case, it is within the scope of this invention.

While the foregoing description includes many details and specificities, it is to be understood that these have been included for purposes of explanation only, and are not to be interpreted as limitations of the present invention. It will be apparent to those skilled in the art that other modifications to the embodiments described above can be made without departing from the spirit and scope of the invention. Accordingly, such modifications are considered within the scope of the invention as intended to be encompassed by the following claims and their legal equivalents.

What is claimed is:

1. A computer-implemented communication routing method implemented by a communication routing system for providing flexible outbound communication options and effectively allocating resources of the communication routing system, the communication routing system including at least a central server system having a processing unit, the method comprising:
   receiving an incoming communication over an inbound communication channel at the communication routing system from a user;
   dynamically assessing demands on the communication routing system in relation to available resources;
   selecting at least one communication target at one of multiple communication centers for the user;
   determining, using the processing unit, an estimated wait time for routing the user to the at least one communication target based on the demands on the communication routing system;
   providing at least one outbound communication option upon holding the user longer than the estimated wait time, the at least one outbound communication option providing for the user to receive an outbound communication;
   receiving a selection of the at least one of outbound communication option and sending the selection to the processing unit;
   scheduling, using the processing unit, an outbound communication based on the selected outbound communication option and storing scheduled outbound communication information in a queue in a database;
   reallocating resources in the communication routing system based at least in part on the selected outbound communication option;
   retrieving, using the processing unit, the scheduled outbound communication information from the database and forwarding the outbound communication information to a selected communication target; and contacting the user from the selected communication target based on the selected outbound communication option.

2. The computer-implemented communication routing method of claim 1, wherein the inbound communication channel is one of telephone, mail, internet or in-person.

3. The computer-implemented communication routing method of claim 1, wherein the outbound communication channel is one of telephone, mail, internet or in-person.

4. The computer-implemented communication routing method of claim 1, further comprising determining the estimated wait time for routing the user based on at least one of length of the queue in the database, priority of the user, and availability of the communication routing system resources.

5. The computer-implemented communication routing method of claim 4, wherein priority of the user is based on information stored in the database including at least one of user identity, user account status and business relation.

6. The computer-implemented communication routing method of claim 1, further comprising dynamically assessing demands on the communication routing system in relation to available resources using the processing unit, the demands including a number of live users and a number of scheduled outbound communications.

7. The computer-implemented communication routing method of claim 6, wherein the available resources include a number of resources available to service outbound communications and a number of resources servicing scheduled outbound communications.

8. The computer-implemented communication routing method of claim 1, wherein the communication routing system is a virtual call center integrating telephony with computers.

9. The computer-implemented communication routing method of claim 1, wherein the multiple outbound communication options comprise at least one of:
    contacting the user upon an availability of the resources in the communication routing system;
    contacting the user at a specific time;
    contacting the user during a specific time range; and
    contacting the user at a relative time.

10. A computer-implemented communication routing system including a processing unit, a communication unit, and a storage device, the system for providing flexible outbound communication options and effectively allocating resources of the communication routing system, the system comprising:
    a receiver module that receives an incoming communication over an inbound communication channel at the communication routing system from a user;
    a central server implementing the processing unit for,
        dynamically assessing demands on the communication routing system in relation to available resources;
        selecting at least one communication target at one of multiple communication centers for the user;
        determining, using the processing unit, an estimated wait time for routing the user to the at least one communication target based on the demands on the communication routing system;
    an interactive module implementing the processing unit, the communication unit and the storage device, that provides at least one outbound communication option upon holding the user longer than the estimated wait time, the at least one outbound communication option providing for the user to receive an outbound communication, and receives a selection of the at least one of outbound communication option and sends the selection to the processing unit;
    a scheduling module implementing the processing unit that schedules an outbound communication based on the selected outbound communication option and stores the scheduled outbound communication information in a queue in a database;
    a resource module implementing the processing unit that reallocates resources in the communication routing system based at least in part on the selected outbound communication option, and retrieves the scheduled outbound communication information from the database; and
    an outbound communication module implementing the processing unit that contacts the user from a selected communication target based on the selected outbound communication option.

11. The computer-implemented communication routing system of claim 10, wherein the inbound communication channel is one of telephone, mail, internet or in-person.

12. The computer-implemented communication routing system of claim 10, wherein the outbound communication channel is one of telephone, mail, internet or in-person.

13. The computer-implemented communication routing system of claim 10, wherein the central server further implements the processing unit for determining the estimated wait time for routing the user based on at least one of length of the queue in the database, priority of the user, and availability of the communication routing system resources.

14. The computer-implemented communication routing system of claim 13, wherein priority of the user is based on information stored in the database including at least one of user identity, user account status and business relation.

15. The computer-implemented communication routing system of claim 10, wherein the central server further implements the processing unit for dynamically assessing demands on the communication routing system in relation to available resources using the processing unit, the demands including a number of live users and a number of scheduled outbound communications.

16. The computer-implemented communication routing system of claim 15, wherein the available resources include a number of resources available to service outbound communications and a number of resources servicing scheduled outbound communications.

17. The computer-implemented communication routing system of claim 10, wherein the communication routing system is a virtual call center integrating telephony with computers.

18. The computer-implemented communication routing system of claim 10, wherein the multiple outbound communication options comprise at least one of:
    contacting the user upon an availability of the resources in the communication routing system;
    contacting the user at a specific time;
    contacting the user during a specific time range; and
    contacting the user at a relative time.

19. A computer-implemented communication routing method implemented by a communication routing system for providing flexible outbound communication options and effectively allocating resources of the communication routing system, the communication routing system including at least a central server system having a processing unit, the method comprising:

receiving an incoming communication over an inbound communication channel at the communication routing system from a user;

selecting at least one communication target at one of multiple communication centers for the user;

dynamically assessing demands on the communication routing system in relation to available resources using the processing unit, the demands including a number of live users and a number of scheduled outbound communications;

determining, using the processing unit, an estimated wait time for routing the user to the at least one communication target based on at least one of: length of the queue in the database, priority of the user, availability of the communication routing system resources, and the demands of the communication routing system;

providing at least one outbound communication option upon holding the user longer than the estimated wait time, the at least one outbound communication option providing for the user to receive an outbound communication;

receiving a selection of the at least one of outbound communication option and sending the selection to the processing unit;

scheduling, using the processing unit, an outbound communication based on the selected outbound communication option and storing scheduled outbound communication information in a queue in a database;

reallocating resources in the communication routing system based at least in part on the selected outbound communication option;

retrieving, using the processing unit, the scheduled outbound communication information from the database and forwarding the outbound communication information to a selected communication target; and contacting the user from the selected communication target based on the selected outbound communication option.

* * * * *